(12) United States Patent
Ornelas et al.

(10) Patent No.: US 11,102,609 B2
(45) Date of Patent: Aug. 24, 2021

(54) HIGH PRECISION GEOFENCE SYSTEM

(71) Applicant: Zonetap, Inc., Oakland, CA (US)

(72) Inventors: Mario Ornelas, Oakland, CA (US); Matthew Peter Menze, Marquette, MI (US); Miles Phillips, Clover, SC (US)

(73) Assignee: Zonetap, Inc., Oakland, CA (US)

( * ) Notice: Subject to any disclaimer, the term of this patent is extended or adjusted under 35 U.S.C. 154(b) by 0 days.

(21) Appl. No.: 16/983,758

(22) Filed: Aug. 3, 2020

(65) Prior Publication Data

US 2021/0037339 A1 Feb. 4, 2021

Related U.S. Application Data

(60) Provisional application No. 62/882,223, filed on Aug. 2, 2019.

(51) Int. Cl.
*H04W 4/021* (2018.01)
*H04W 4/02* (2018.01)
*G01S 19/51* (2010.01)
*G08B 21/02* (2006.01)
*H04W 4/80* (2018.01)

(52) U.S. Cl.
CPC .......... *H04W 4/021* (2013.01); *G01S 19/51* (2013.01); *G08B 21/02* (2013.01); *H04W 4/023* (2013.01); *H04W 4/80* (2018.02)

(58) Field of Classification Search
CPC ....... H04W 4/021; H04W 4/80; H04W 4/023; G01S 19/51; G08B 21/02

USPC ...................................................... 455/456.1
See application file for complete search history.

(56) References Cited

U.S. PATENT DOCUMENTS

| 2015/0312740 | A1* | 10/2015 | Li | H04W 4/90 |
| | | | | 455/404.2 |
| 2020/0154237 | A1* | 5/2020 | Douglas, Jr. | H04W 4/90 |
| 2020/0267936 | A1* | 8/2020 | Tran | A01K 29/005 |

* cited by examiner

*Primary Examiner* — Charles N Appiah
*Assistant Examiner* — Frank E Donado
(74) *Attorney, Agent, or Firm* — Schwegman Lundberg & Woessner, P.A.

(57) ABSTRACT

Disclosed are systems, methods, and non-transitory computer-readable media for a high precision geofence system. An external location device providing high-accuracy location data is used in conjunction with a client device. The external location device includes components to provide high-accuracy location data, such as a higher quality and more robust antenna than what is included in current client devices. The antenna and other components may be purpose built to determine a geographic location of the external location device, such as by being designed specifically for the sole purpose of accepting Global Positioning System signals. By limiting the components included in the external location device to those used for its primary purpose of determining its geographic location, the size and cost of the external location device can be minimized. Accordingly, the external location device may be designed to be attached/affixed to a client device or easily carried by a user.

20 Claims, 7 Drawing Sheets

HIGH PRECISION GEOFENCE SYSTEM

CROSS-REFERENCE TO RELATED APPLICATIONS

The present application claims the benefit of priority of U.S. Provisional Application No. 62/882,223, filed on Aug. 2, 2019, which is incorporated herein by reference in its entirety.

TECHNICAL FIELD

An embodiment of the present subject matter relates generally to geofencing and, more specifically, to a high precision geofence system.

BACKGROUND

Accidents occurring in dangerous work environments, such as construction sites, regularly cause severe injury and even death. These accidents often occur because heavy machine operators are not able to see other workers located in the proximity of the machine and/or workers are distracted and become unaware of their everchanging physical environment. Smart phones provide location based services, however the location data they generate is far too inaccurate to be relied upon in dangerous work environments. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a high precision geofence system. Client devices, such as smartphones, tablets, smart watches, and the like, are increasingly being used to provide location-based services. Most people own one or more of these client devices and keep them nearby at almost all time. Accordingly, the location of a client device often provides a relatively accurate indicator of the location of the owner of the client device.

Many clients devices, such as smartphones, are equipped with an antenna that is used for determining the geographic location of the smart phone, as well as other purposes, such as facilitating phone calls, connecting to Wi-Fi and the like. With the included antenna, most client devices achieve an average accuracy of about 5 feet. While this accuracy may adequate for many purposes, such as providing directions to a specified destination, it is inadequate for certain high-risk environments. For example, in dangerous worksite environments, a misstep of a few feet could result in a severe injury or death. While higher-accuracy location devices are available, these devices are often too expensive and large to practically be used to provide protection for a high number of users.

To alleviate the shortcomings of current client devices, an external location device providing high-accuracy location data is used in conjunction with a client device. The external location device is a device including components to provide high-accuracy location data, such as a higher quality and more robust antenna than what is included in current client devices. The antenna and other components may be purpose built to determine a geographic location of the external location device, such as by being designed specifically for the sole purpose of accepting Global Positioning System (GPS) signals. By limiting the components included in the external location device to those used for its primary purpose of determining its geographic location, the size and cost of the external location device can be minimized. Accordingly, the external location device may be designed to be attached/affixed to a client device or easily carried by a user. For example, the external location device may be worn as a wearable device affixed around the wrist of a user.

The external location device may communicate with the client device using a short-range wireless technology standard, such as Bluetooth, Wi-Fi, near-field communication, and the like, to provide highly accurate location data to the client device. The accuracy of location data determined by the external location device may be further enhanced through use of a base station using real-time kinematic (RTK) positioning. The high-accuracy location data provided to the client device may be used in any of a variety of ways, such as to provide alerts based on geo-fences to warn users of potential dangers.

Figure 1:
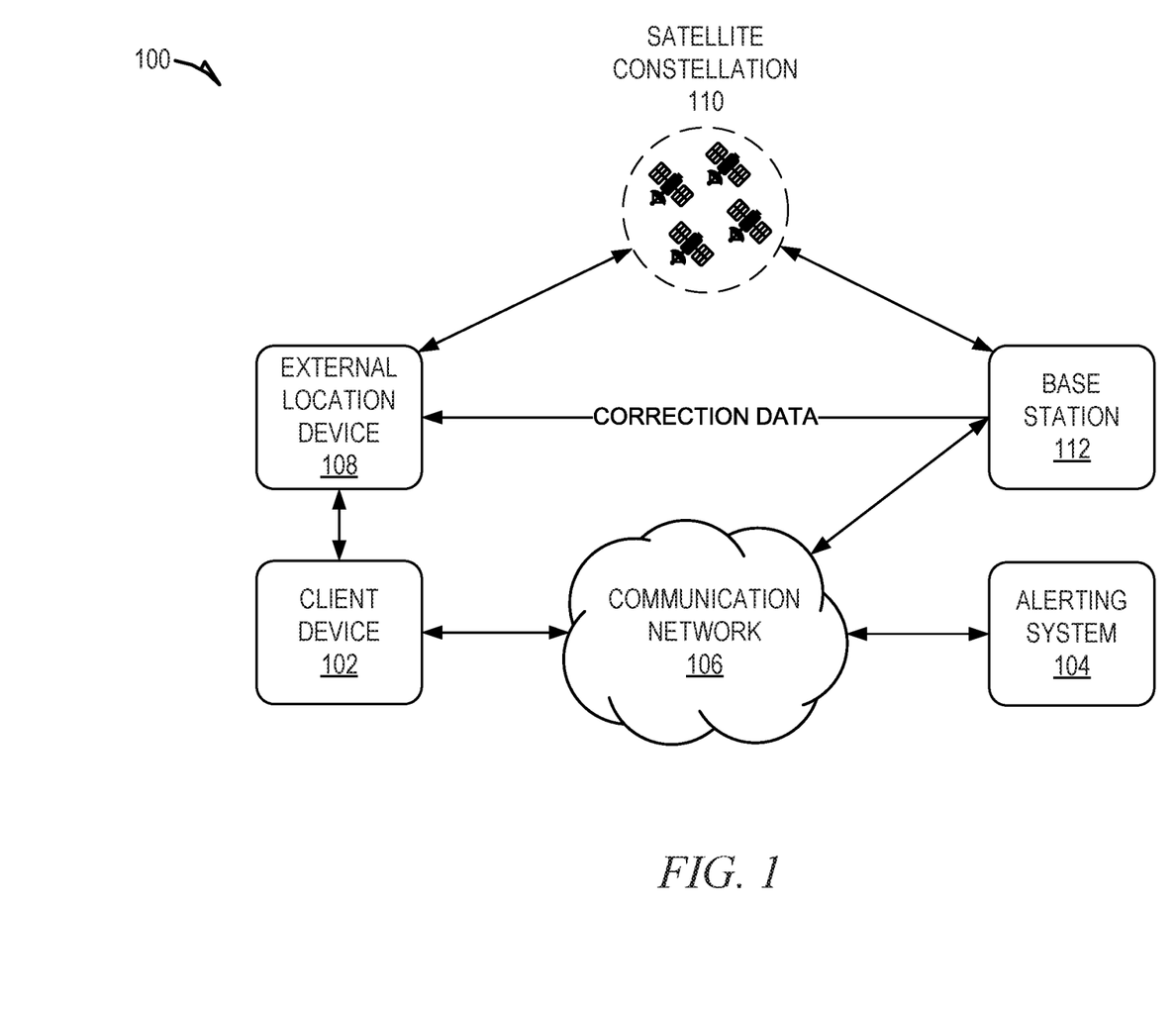
FIG. 1 is a block diagram of a high precision geofence system, in accordance with some example embodiments.

FIG. 1 is a block diagram of a high precision geofence system 100, in accordance with some example embodiments. As shown, the system 100 includes a client device 102, and an alerting system 104 connected to a communication network 106 and configured to communicate with each other through use of the communication network 106. The communication network 106 is any type of network, including a local area network (LAN), such as an intranet, a wide area network (WAN), such as the internet, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC), or an Internet of Things (Iot) device, such as a sensor, wearable, smart meter, etc. A computing device can include some or all of the features, components, and peripherals of the machine 700 shown in FIG. 7.

To facilitate communication with other computing devices, a computing device may include a communication interface configured to receive a communication, such as a request, data, and the like, from another computing device in network communication with the computing device and pass the communication along to an appropriate module running on the computing device. The communication interface also sends a communication to another computing device in network communication with the computing device.

The alerting system 104 provides alerts based on location data received from the client device 102. The location received from a client device 102 identifies the geographic location of the client device 102. The alerting system 104 uses the location data to determine whether any triggering condition have been satisfied. A triggering condition is a set of conditions associated with a corresponding alert action that is executed if the triggering condition is satisfied. A triggering condition may define a geofence or threshold distance from a specified location and/or other client devices, as well as a rule indicating when the triggering condition is satisfied based on the location of the client device 102. For example, the rule may dictate that the triggering condition is satisfied if the geographic location of the client device 102 is within the specified geofence or threshold distance of a specified location or other client device 102. As another example, the rule may dictate that the triggering condition is satisfied if the geographic location of the client device 102 is outside of the specified geofence or threshold distance of a specified location or other client device 102.

Upon determining that a triggering condition has been satisfied, the alerting system 104 executes the alert action corresponding to the satisfied triggering condition. The alert action may include any of a variety of actions, such as transmitting an alert to the client device 102 that satisfied the triggering condition, transmitting an alert to other client devices 102, initiating an alarm, and the like. This functionality can be used to provide alerts indicating that a user is in danger based on their location and/or based on their location in proximity to other devices. For example, the alerting system 104 may be employed in a dangerous work environment, such as a construction site.

When providing alerts in a dangerous work environment, the accuracy of the location data is critical. Accordingly, the client device 102 utilizes the functionality of an external location device 108 to provide highly accurate location data. The external location device 108 is a device designed to provide highly accurate location data. For example, the external location device 108 may include a higher quality and more robust antenna than what is included in client device 102. The antenna and other components of the external location device 108 may be purpose built to determine a geographic location of the external location device 108, such as by being designed specifically for the sole purpose of accepting GPS signals. By limiting the components included in the external location device 108 to those used for its primary purpose of determining its geographic location, the size and cost of the external location device 108 can be minimized. Accordingly, the external location device 108 may be designed to be attached/affixed to a client device 102 or easily carried by a user of the client device 102. For example, the external location device 108 may be worn as a wearable device affixed around the wrist of a user.

As shown, the external location device 108 communicates directly with the client device 102. For example, the external location device 108 and the client device 102 may communication using a short-range wireless technology standard, such as Bluetooth, Wi-Fi, near-field communication, and the like.

To provide highly accurate location data, the external location device 108 communicates with a satellite constellation 110. For example, the external location device 108 receives signals (e.g., time stamps) from the satellite constellation 110, which are used to determine the geographic location of the external location device 108. The accuracy of the location data determined by the external location device 108 may be further enhanced through use of a base station 112 using RTK positioning. The base station 112 is a device at a known position that also communicates with the satellite constellation 110. For example, the base station 112 receives signals from the satellite constellation 110 generates correction data (e.g., a correction factor). The base station 112 broadcasts the correction data to the external location device 108. For example, the base station 112 broadcasts the correction directly to the external location device 108 via radio. Alternatively, the base station may transmit the correction data to the external location device 108 via the alerting system 104. For example, the base station 112 may be in network communication with the alerting system 104 via the communication network 106. The base station 112 may transmit the correction data to the alerting system 104 via the communication network 106. In turn, the alerting system 104 may forward the correction data to the client device 102, which may forward the correction data to the external location device 108.

In some embodiments, the external location device 108 uses the correction data to further enhance the accuracy of its location data. For example, the external location device 108 may use the correction data to enhance the accuracy of its location data to within 0.1 feet. In some embodiments, however, the client device 102, rather than the external location device 108, may use the correction data to enhance the accuracy of the location data. For example, the external location device 108 may provide its location data to the client device 102 and the client device 102 may use the correction data received from the base station 112, either via direct transmission from the base station 112 or via the alerting system, to enhance the accuracy of the location data received from the external location device 102.

Although the shown system 100 includes only one client device 102, external location device 108 and base station 112, this is for ease of explanation and is not meant to be limiting. One skilled in the art would appreciate that the system 100 can include any number of client devices 102, external location devices 108 and base stations 112. Further, the alerting system 104 may concurrently accept connections from and interact with any number of client device 102, and may support connections from a variety of different types of client devices 102, such as desktop computers; mobile computers; mobile communications devices, e.g., mobile phones, smart phones, tablets; smart televisions; set-top boxes; keypads; and/or any other network enabled computing devices. Hence, the client device 102 may be of varying type, capabilities, operating systems, and so forth.

Figure 2:
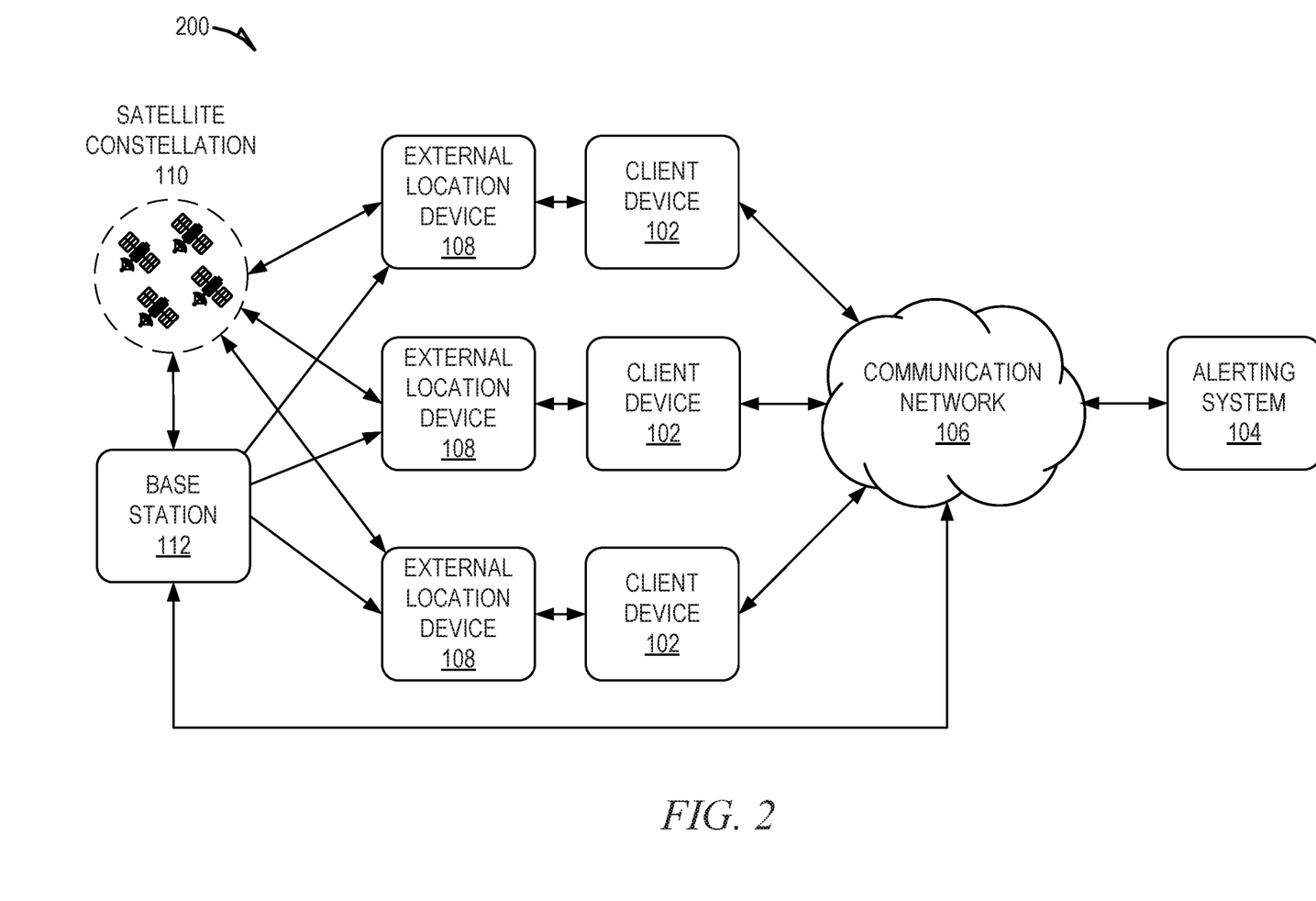
FIG. 2. is a block diagram of a high precision geofence system, in accordance with some example embodiments.

FIG. 2. is a block diagram of a high precision geofence system 200, in accordance with some example embodiments. As shown in FIG. 2, multiple client devices 102 can communicate with the alerting system 104 via the communication network 106. Each client device 102 may utilize a separate external location device 108 to determine highly accurate location data, which is provided by the client device 102 to the alerting system 104. Each external location device 108 communicates with the satellite constellation 110 to determine its geographic location. Further, a base station 112 may broadcast correction data to multiple client devices 102/external location devices 109 either directly or via the alerting system 104. The correction data is used to further enhance the accuracy of the location data determined by each external location device 108.

Figure 3:
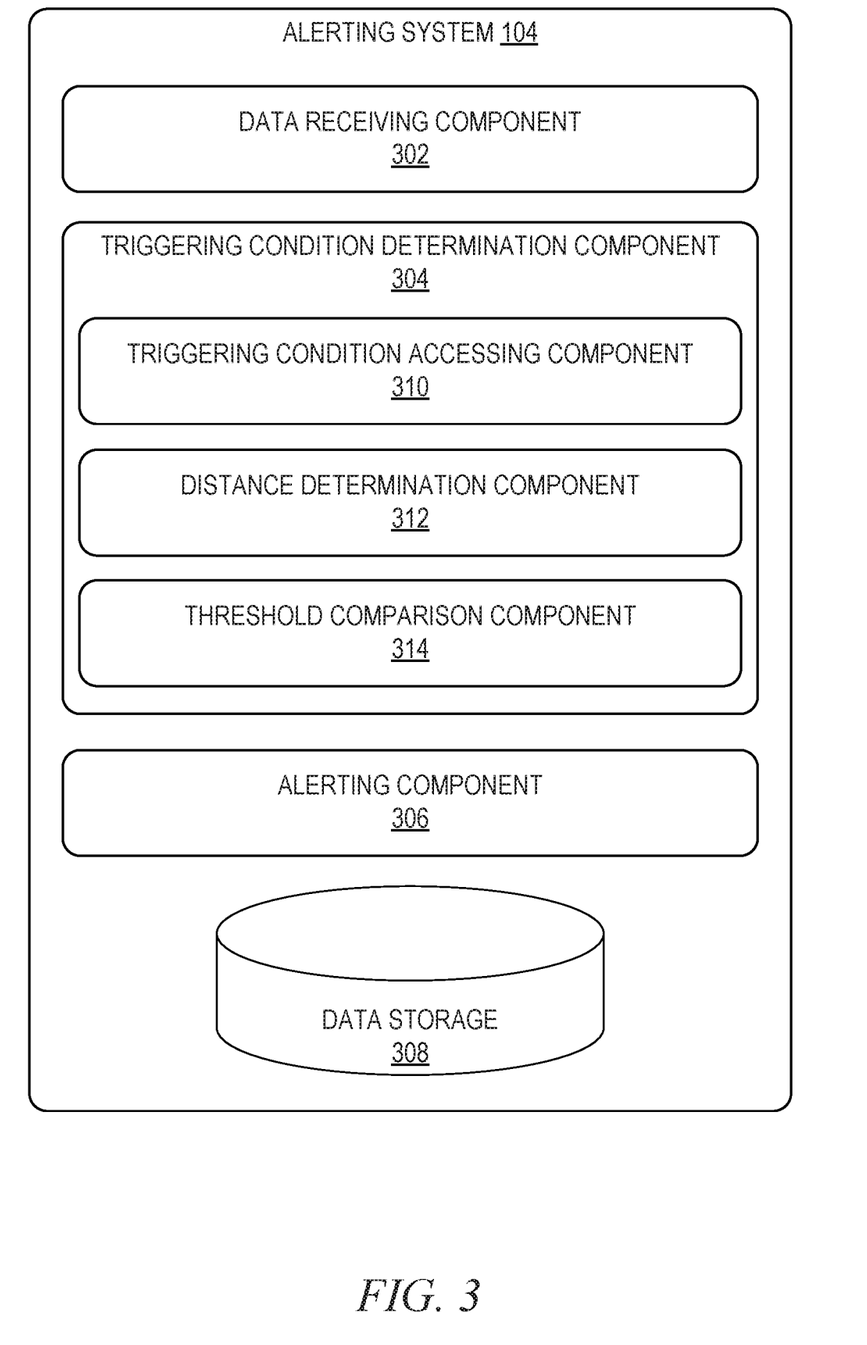
FIG. 3 is a block diagram of an alerting system, in accordance with some example embodiments.

FIG. 3 is a block diagram of an alerting system 104, in accordance with some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the alerting system 104 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the alerting system 104 includes a data receiving component 302, a triggering condition determination component 304, an alerting component 306, and a data storage 308. The data receiving component 302 receives location data from client devices 102. The location data describes a geographic location of the client device 102 from which the location data was received. The location data may also include an identifier identifying the client device 102 and/or an account of the alerting system.

The triggering condition determination component 304 determines whether a triggering condition has been satisfied. A triggering condition is a set of conditions associated with a corresponding alert action that is executed if the triggering condition is satisfied. A triggering condition may define a geofence or threshold distance from a specified location and/or other client devices 102, as well as a rule indicating when the triggering condition is satisfied based on the location of the client device 102. For example, the rule may dictate that the triggering condition is satisfied if the geographic location of the client device 102 is within the specified geofence or threshold distance of a specified location or other client device 102. As another example, the rule may dictate that the triggering condition is satisfied if the geographic location of the client device 102 is outside of the specified geofence or threshold distance of a specified location or other client device 102.

As shown, the triggering condition determination component 304 includes a triggering condition accessing component 310, a distance determination component 312, and a threshold comparison component 314.

The triggering condition determination component 304 accesses a set of triggering conditions from the data storage 308. For example, the triggering condition determination component 304 may use an identified received with the location data to identify the set of triggering conditions from the data storage 308.

The distance determination component 312 uses location data gathered from client devices 102 to determine the distance of the client devices 102 from each other and/or from specified locations. For example, the distance determination component 312 may determine the distance of the client devices 102 from locations within predetermined geofences. The geofences may be established to cover specified danger zones at a work site, such as areas with known hazards, areas where heavy equipment operate, and the like The distance determination component 312 uses the location data of the client devices 102 and stored location data defining the geofences to determine the distance of the client devices 102 from each other and/or from the specified locations.

The threshold comparison component 314 uses the determined distances and the thresholds defined the triggering conditions to determine whether any of the triggering conditions have been satisfied. For example, the threshold comparison component 314 may determine whether a client device 102 is within a threshold distance of another client device 102 indicating danger and/or within a threshold distance of a predefined danger zone (e.g., within a geofence defining the danger zone). Alternatively, the threshold comparison component 314 may also determine whether the client device 102 is outside of a threshold distance of a predefined safe zone (e.g., within a geofence defining the safe zone) and/or beyond a threshold distance of the other client devices 102.

In the event that the threshold comparison component 314 determines that a triggering condition has been satisfied, the threshold comparison component 314 notifies the alerting component 306. For example, the threshold comparison component 314 provides the alerting component 306 with data identifying the client device 102 or client devices 102 that satisfied the triggering condition, data identifying the triggering condition that was satisfied, and/or data identifying the alert condition corresponding to the satisfied triggering condition.

In turn, the alerting component 306 cause execution of the alerting action. This may include causing presentation of an alert by the client device 102, initiating an alary, notifying a specified users, and the like.

Figure 4:
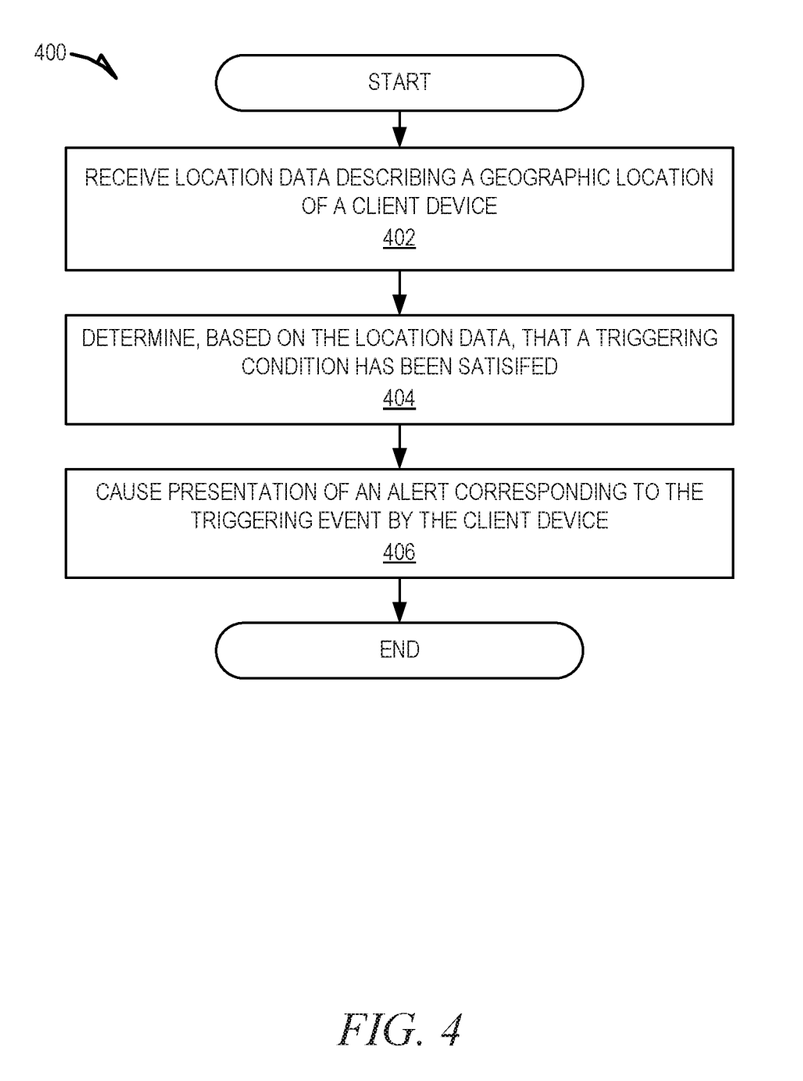
FIG. 4. is a flowchart showing an example method for providing a high precision geofence system, according to certain example embodiments.

FIG. 4 is a flowchart showing an example method 400 for providing a high precision geofence system, according to certain example embodiments. The method 400 may be embodied in computer readable instructions for execution by one or more processors such that the operations of the method 400 may be performed in part or in whole by the alerting system 104; accordingly, the method 400 is described below by way of example with reference thereto. However, it shall be appreciated that at least some of the operations of the method 400 may be deployed on various other hardware configurations and the method 400 is not intended to be limited to the alerting system 104.

At operation 402, the data receiving component 302 receives location data describing a geographic location of a client device 102. The data receiving component 302 receives location data from client devices 102. The location data describes a geographic location of the client device 102 from which the location data was received. The location data may also include an identifier identifying the client device 102 and/or an account of the alerting system.

At operation 404, the triggering condition determination component 304 determines, based on the location data, that a triggering condition has been satisfied. For example, the triggering condition determination component 304 determines the distance between the client device 102 and other client devices 102 and/or specified geofences that are defined by triggering conditions. The triggering condition determination component 304 then determines whether the distance transgresses a specified threshold (e.g., exceeds or does not exceed) to cause satisfaction of the triggering condition. In the event that the triggering condition determination component 304 determines that a triggering condition has been satisfied, the triggering condition determination component 304 notifies the alerting component 306. For example, the triggering condition determination component 304 provides the alerting component 306 with data identifying the client device 102 or client devices 102 that satisfied the triggering condition, data identifying the triggering condition that was satisfied, and/or data identifying the alert condition corresponding to the satisfied triggering condition.

In turn, the alerting component 306 cause execution of the alerting action. Accordingly, at operation 406, the alerting component 306 causes presentation of an alert corresponding to the triggering event by the client device 102.

Figure 5:
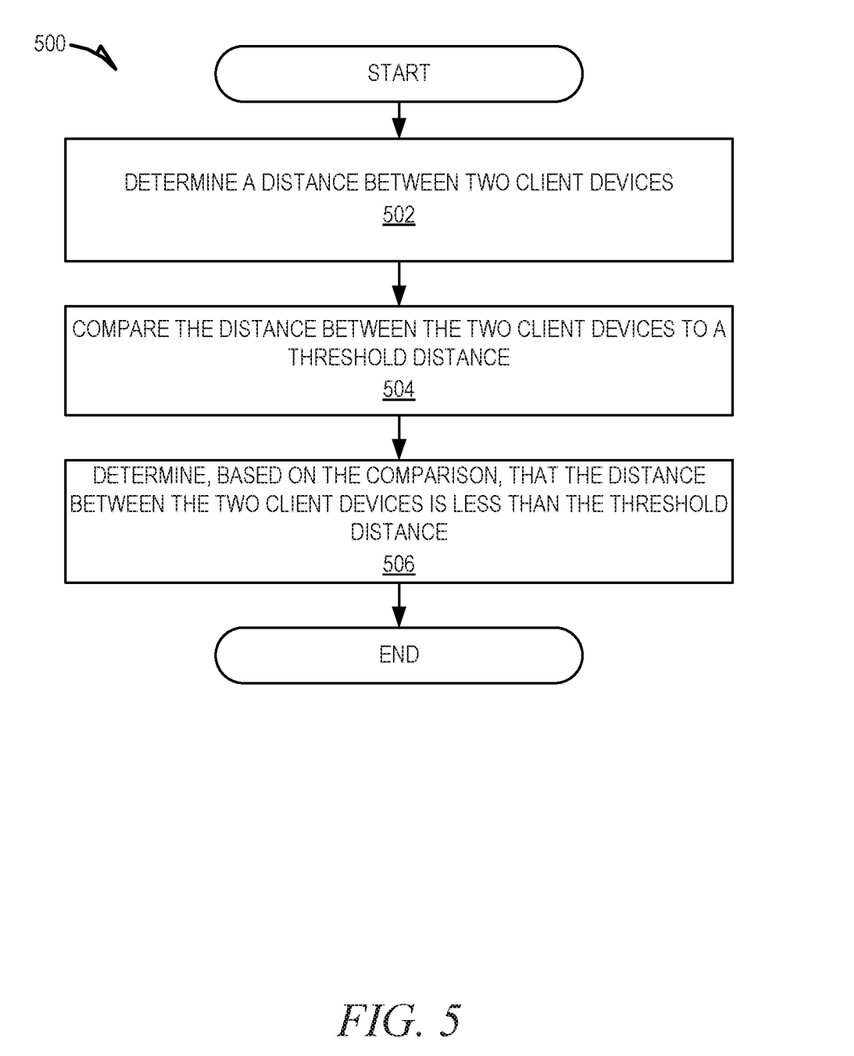
FIG. 5 is a flowchart showing an example method for determining that a triggering condition has been satisfied, according to certain example embodiments.

FIG. 5 is a flowchart showing an example method 500 for determining that a triggering condition has been satisfied, according to certain example embodiments. The method 500 may be embodied in computer readable instructions for execution by one or more processors such that the operations of the method 500 may be performed in part or in whole by the alerting system 104; accordingly, the method 500 is described below by way of example with reference thereto. However, it shall be appreciated that at least some of the operations of the method 500 may be deployed on various other hardware configurations and the method 500 is not intended to be limited to the alerting system 104.

At operation 502, distance determination component 312 determines a distance between two client devices 102. For example, the distance determination component 312 uses location data gathered from both client devices 102 to determine the geographic location of each client device 102. The distance determination component 312 then uses the geographic location of each client device 102 to determine the distance between them.

At operation 504, the threshold comparison component 314 compares the distance between the two client devices 102 to a threshold distance. The threshold distance may be defined by a triggering configuration. For example, the threshold distance may indicate a minimum distance that the client devices 102 should remain from each other to ensure that an accident does not occur. This may be useful when one client device 102 indicates the location of a human user and the other client device 102 indicates the location of heavy machinery.

At operation 506, the threshold comparison component 314 determines, based on the comparison, that the distance between the two client devices is less than the threshold distance.

Software Architecture

Figure 6:
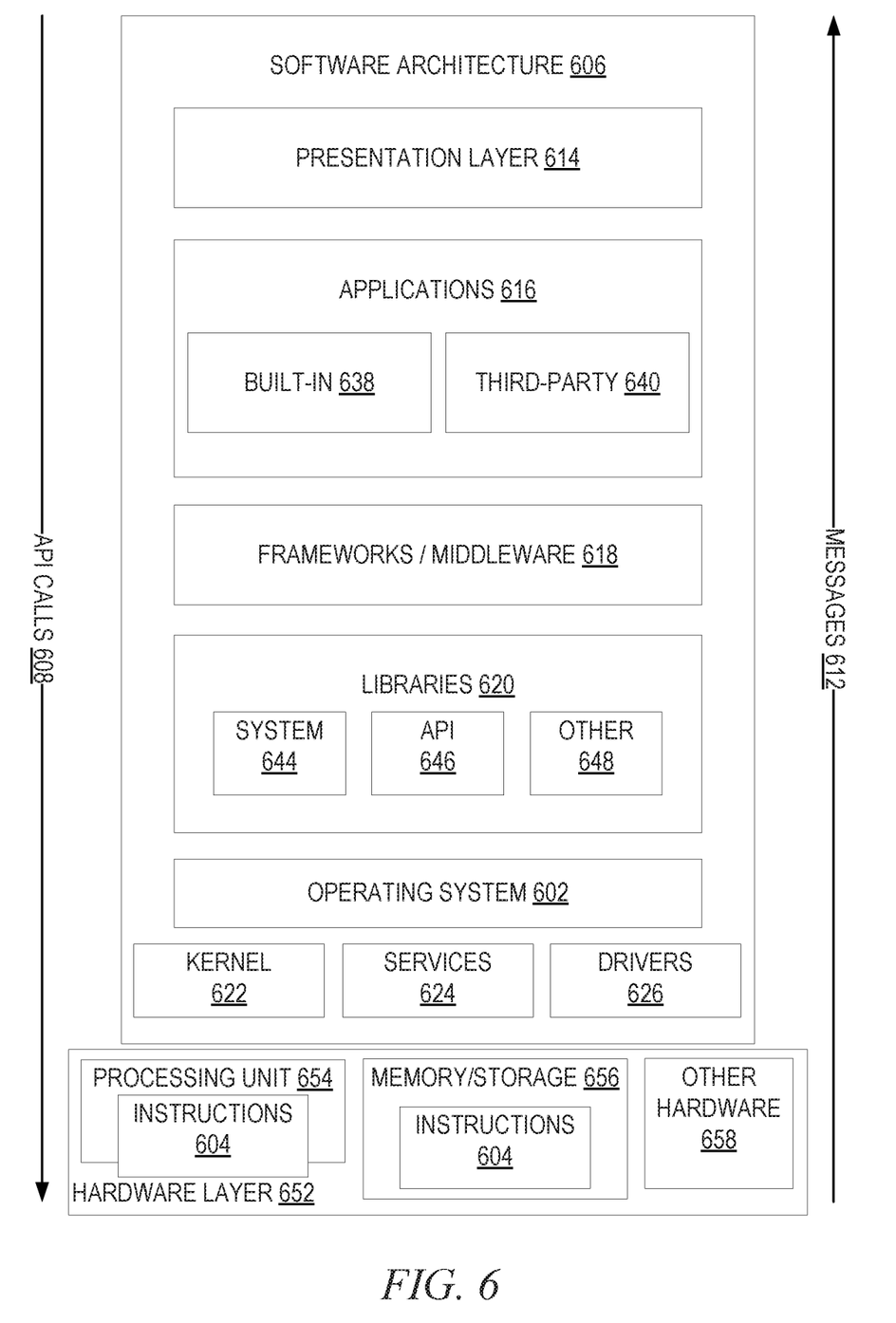
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
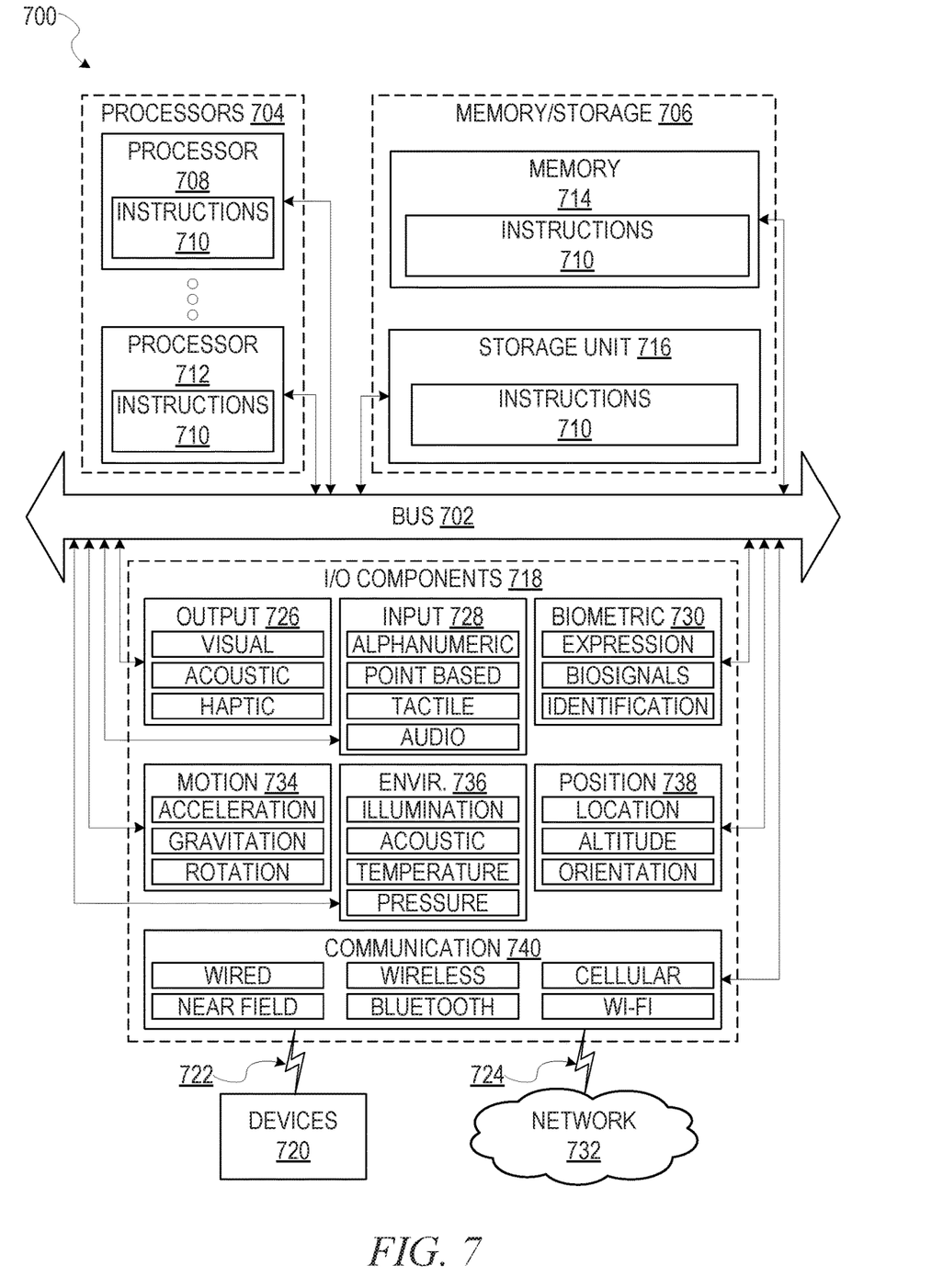
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the describe and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" refers to "non-transitory" machine-readable mediums and excludes signals or other "transitory" computer readable mediums. A "non-transitory" machine-readable medium is a physical device that can store data for a period of time during which the stored data may be transferrable or reproducible. Examples of a non-transitory machine-readable medium are a physical memory device, Random Access Memory (RAM), etc. In contrast, transitory machine-readable mediums are not physical and store data only momentarily, such as a signal.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method comprising:
   receiving, by a cloud based server, correction data from a first base station positioned at a first known geographic position, the base station having generated the correction data based on signals received from a first satellite constellation;
   transmitting the correction data received from the first base station to a first client device;
   receiving, by the cloud based server, first location data from the first client device, the first location data describing a geographic location of the first client device, the first location data having been determined by a first high-accuracy location determination device that is wirelessly connected to the first client device via a wireless protocol, the first high-accuracy location determination device having:
      received the correction data from the first client device upon the correction data being forwarded by the first client device,
      determined the first location data by enhancing second location data determined by the first high-accuracy location determination device with the correction data transmitted to the first client device by the cloud based server, and
      transmitted the first location data to the first client device,
      wherein the first high-accuracy location determination device is external to the client device and includes components for communicating with the satellite constellation to receive signals used to determine the second location data;
   determining, based on the first location data describing the geographic location of the first client device and a first rule, that a first triggering condition has been satisfied, the first rule dictating that the first triggering condition is satisfied when the geographic location of the first client device is within a specified geofence or threshold distance of either a specified location or other client device; and
   in response to determining that the first triggering condition has been satisfied, causing presentation of a first alert by the first client device, the first alert corresponding to the first triggering condition.

2. The method of claim 1, further comprising:
   receiving, from a second client device, third location data describing a geographic location of the second client device, the third location data having been determined by a second high-accuracy location determination device paired to the second client device, wherein the second high-accuracy location determination device is different than the first high-accuracy location determination device, and the second high-accuracy location determination device is remote to the second client device.

3. The method of claim 2, wherein determining that the first triggering condition has been satisfied is based on the first location data and the third location data.

4. The method of claim 3, further comprising causing presentation of the first alert by the second client device.

5. The method of claim 3, wherein determining that the first triggering condition has been satisfied comprises:
   determining, based on the first location data and the third location data, that the geographic location of the first client device is within a threshold distance of the second client device.

6. The method of claim 1, wherein determining that the first triggering condition has been satisfied comprises:
   determining, based on the first location data, that the geographic location of the first client device is within a first geofence.

7. The method of claim 6, wherein the first geofence defines a location surrounding a construction machine.

8. The method of claim 1, wherein the first high-accuracy location determination device is a wearable device.

9. The method of claim 1, wherein the first high-accuracy location determination device is paired to the first client device using a short-range wireless technology standard.

10. The method of claim 9, wherein the short-range wireless technology standard is Bluetooth.

11. A cloud based system comprising:
    one or more computer processors; and
    one or more computer-readable mediums storing instructions that, when executed by the one or more computer processors, cause the system to perform operations comprising:
    receiving correction data from a first base station positioned at a first known geographic position, the base station having generated the correction data based on signals received from a first satellite constellation;
    transmitting the correction data received from the first base station to a first client device;
    receiving first location data from the first client device, the first location data describing a geographic location of the first client device, the first location data having been determined by a first high-accuracy location determination device that is wirelessly connected to the first client device via a wireless protocol, the first high-accuracy location determination device having:
       received the correction data from the first client device upon the correction data being forwarded by the first client device,
       determined the first location data by enhancing second location data determined by the first high-accuracy location determination device with the correction data transmitted to the first client device by the cloud based server, and
       transmitted the first location data to the first client device,
    wherein the first high-accuracy location determination device is external to the client device and includes components for communicating with the satellite constellation to receive signals used to determine the second location data;

determining, based on the first location data describing the geographic location of the first client device and a first rule, that a first triggering condition has been satisfied, the first rule dictating that the first triggering condition is satisfied when the geographic location of the first client device is within a specified geofence or threshold distance of either a specified location or other client device; and in response to determining that the first triggering condition has been satisfied, causing presentation of a first alert by the first client device, the first alert corresponding to the first triggering condition.

12. The system of claim 11, the operations further comprising:

receiving, from a second client device, third location data describing a geographic location of the second client device, the third location data having been determined by a second high-accuracy location determination device paired to the second client device, wherein the second high-accuracy location determination device is different than the first high-accuracy location determination device, and the second high-accuracy location determination device is remote to the second client device.

13. The cloud based system of claim 12, wherein determining that the first triggering condition has been satisfied is based on the first location data and the third location data.

14. The cloud based system of claim 13, the operations further comprising causing presentation of the first alert by the second client device.

15. The cloud based system of claim 13, wherein determining that the first triggering condition has been satisfied comprises:

determining, based on the first location data and the third location data, that the geographic location of the first client device is within a threshold distance of the second client device.

16. The cloud based system of claim 11, wherein determining that the first triggering condition has been satisfied comprises:

determining, based on the first location data, that the geographic location of the first client device is within a first geofence.

17. The cloud based system of claim 16, wherein the first geofence defines a location surrounding a construction machine.

18. The cloud based system of claim 11, wherein the first high-accuracy location determination device is a wearable device.

19. The cloud based system of claim 11, wherein the first high-accuracy location determination device is paired to the first client device using a short-range wireless technology standard.

20. A non-transitory computer-readable medium storing instructions that, when executed by one or more computer processors of a cloud based server, cause the cloud based server to perform operations comprising:

receiving correction data from a first base station positioned at a first known geographic position, the base station having generated the correction data based on signals received from a first satellite constellation;

transmitting the correction data received from the first base station to a first client device;

receiving first location data from the first client device, the first location data describing a geographic location of the first client device, the first location data having been determined by a first high-accuracy location determination device that is wirelessly connected to the first client device via a wireless protocol, the first high-accuracy location determination device having:

received the correction data from the first client device upon the correction data being forwarded by the first client device, determined the first location data by enhancing second location data determined by the first high-accuracy location determination device with the correction data transmitted to the first client device by the cloud based server, and transmitted the first location data to the first client device, wherein the first high-accuracy location determination device is external to the client device and includes components for communicating with the satellite constellation to receive signals used to determine the second location data;

determining, based on the first location data describing the geographic location of the first client device and a first rule, that a first triggering condition has been satisfied, the first rule dictating that the first triggering condition is satisfied when the geographic location of the first client device is within a specified geofence or threshold distance either a specified location or other client device; and in response to determining that the first triggering condition has been satisfied, causing presentation of a first alert by the first client device, the first alert corresponding to the first triggering condition.

* * * * *